June 12, 1928.

R. HUGERSHOFF 1,673,680

DEVICE FOR COPYING FROM PAIRS OF PHOTOGRAPHS

Filed Oct. 11, 1926

2 Sheets-Sheet 1

Inventor:
R. Hugershoff
By: Marks & Clerk
Attys.

June 12, 1928.  1,673,680

R. HUGERSHOFF

DEVICE FOR COPYING FROM PAIRS OF PHOTOGRAPHS

Filed Oct. 11, 1926  2 Sheets-Sheet 2

Inventor:
R. Hugershoff
By: Marks & Clerk
Attys.

Patented June 12, 1928.

1,673,680

UNITED STATES PATENT OFFICE.

REINHARD HUGERSHOFF, OF DRESDEN, GERMANY.

DEVICE FOR COPYING FROM PAIRS OF PHOTOGRAPHS.

Application filed October 11, 1926, Serial No. 140,999, and in Germany October 20, 1925.

This invention relates to an appliance for plotting an orthorogonal projection of a solid represented on two measuring views having any orientation with respect to one another. With apparatus of this kind it has already been proposed to arrange two view carriers which are capable of being moved in space in any direction by means of a three-dimensional cross-slide system and of being adjusted in any direction with respect to one another in a measurable manner, the view carriers being made in the form of image projection appliances and located in front of a binocular observing glass, each of which appliances projects by means of a suitable source of light corresponding parts of the measuring views separately next to one another on a stationary projection surface. It has also been proposed to interpose between the projection objectives and the projection surfaces optical intermediate members for obtaining a sharp image, the optical axes of which always remain directed, each by means of a universal link, onto the front main points of the projection objectives of the view carriers.

The improvement according to the present invention consists substantially in this, that the forming of a sharp image of each projected part of each separate measuring view is effected by a lens capable of being moved at an invariable distance from a fixed point of the corresponding projection surface and that the two projection surfaces are opaque or translucent. By this means the projected parts of the views can be observed as self-luminous (independent of the direction from which they were projected on the surface) by means of a double viewing glass and this viewing glass or double microscope be provided with a substantially immovable optical equipment. As in known types of measuring appliances the measuring marks to be provided in the image planes of the microscope objectives produce, when viewed binocularly, a spatial measuring mark which by a suitable operation of the cross-slide for moving the measuring views can be led along the surface of the space model, so that a pencil mounted on the corresponding part of the cross-slide traces on a fixed drawing surface the required projection of the contour.

Figure 1:
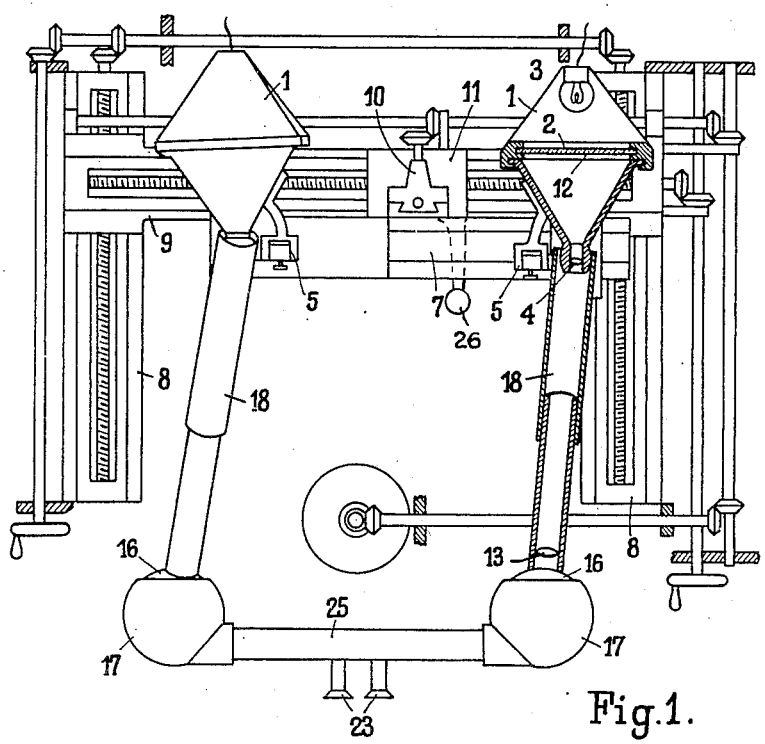
Figure 2:
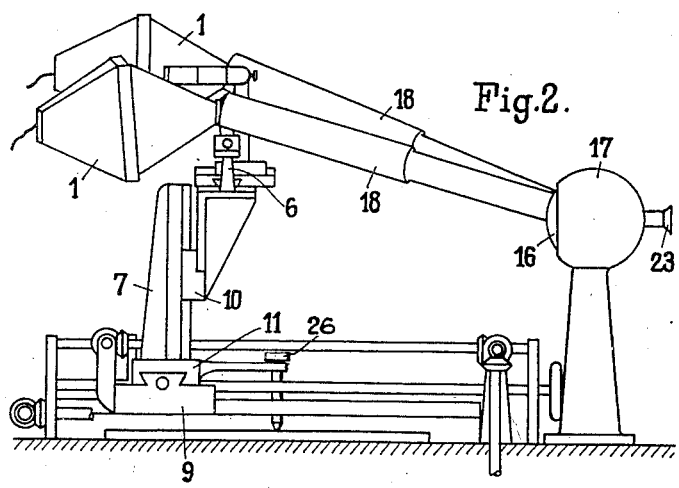
Figure 3:
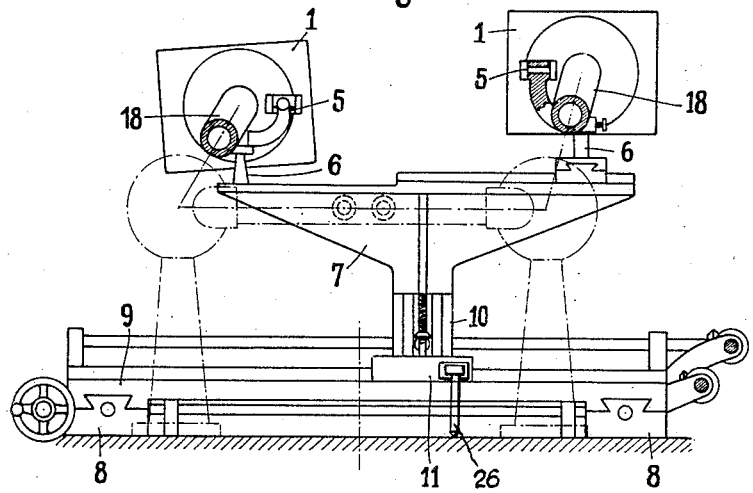
Figure 4:
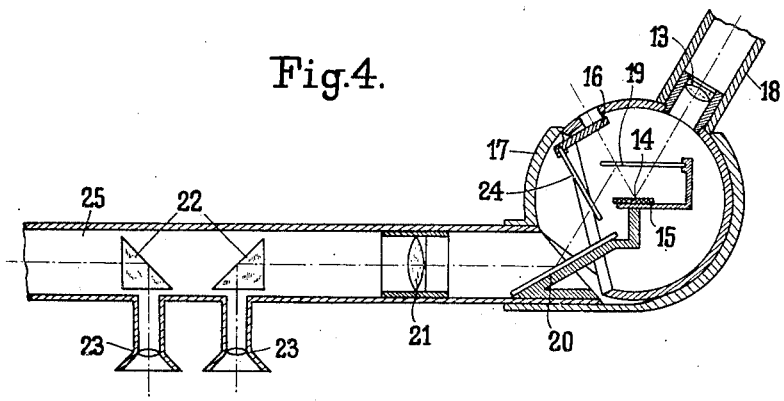
Figure 5:
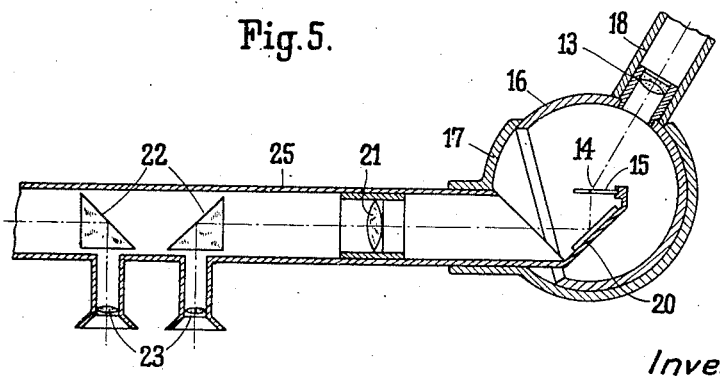

The accompanying drawings show constructional examples of the invention, Figure 1 being a plan view of the entire appliance, partly in horizontal section, Figure 2 a side view of Fig. 1, Figure 3 a front view of the cross-slide system supporting the boxes containing the measuring views and Figs. 4 and 5 two constructional forms showing different arrangements of the reflectors and projection surfaces.

The boxes 1 (Fig. 1) are each provided with a measuring view 2, a source of light 3 and a projection objective 4. The boxes 1 are mounted so as to be capable of rocking and rotating about two axes 5 and 6 at right angles to one another (Fig. 3) and of being fixed in any position by clamping screws. A support 7 constructed in the manner of a cross-slide enables the objectives 4 to be adjusted and fixed relatively to one another. A further cross-slide system consisting of a distance rail 8, a bridge 9 capable of lateral motion and a vertical slide 10, permits of the two boxes 1 being jointly displaced in any direction. A drawing pencil 26 is provided say at the foot 11 of the support 7.

The rays of light emanating from an image point 2 (Fig. 1) of the measuring view 2 located in the focal plane of the objective 4, which are rendered parallel by the objective 4, impinge on an intermediate lens 13 (Figs. 1, 4, 5) and unite in the axial surface part of the focal plane of the same to form a sharp image of the corresponding image point 12.

The surface part of the focal plane of the objective 13 is indicated in Figs. 4 and 5 by a point 14. In Fig. 4 this point lies on an opaque, fixed projection surface 15. The objective 13 is capable of turning in all directions about this point 14. In the constructional form shown, this is effected by means of two hollow spheres 16 and 17. The link 18, in the present case a telescopic tube, provides that the axis of the objective 13 is always directed towards the projection objective 4.

The projection image formed in the point 14 or its immediate vicinity is presented by means of a transparent fixed plate of glass which also acts as a reflector 19 (Fig. 4) and a reflector 20, which is also fixed to the microscope projective 21, which produces in its image plane containing an adjusting mark, a fresh image of the image point 12 which is viewed by the eyepiece 23.

A glass plate 24 which is fixed to the hollow sphere 16 and is rotatable with the same, and which is of the same thickness as the transparent reflector 19 is provided for the purpose of counteracting the parallel displacement of the projecting rays of light coming from the objective 13, caused by the transparent reflector.

When a translucent projection plane is used (Fig. 5), the fixed transparent reflector 19 and the movable plane or parallel glass plate 24 becomes superfluous. The image formed on the translucent projection surface 15 is presented directly by the fixed reflector 20 to the microscope objective 21.

An inverting prism 22 provided at a suitable place in the tube 25 of the double microscope and capable of being adjusted by hand enables, if desired, the relative optical orientation of the part images formed in the image planes of the microscope objectives 21.

What I claim is:

1. An automatically drawing measuring apparatus for pairs of measuring views of a solid object, comprising a three-dimensional cross-slide system, a drawing pencil and two measuring view carriers capable of being moved by the said cross-slide system, an objective in each measuring view carrier located in the centre of projection of the measuring view, a binocular viewing glass, projection surfaces fixed to the binocular viewing glass, one for each of the two measuring views to be separately projected, an intermediate optical member for forming a sharp image of the measuring views on the projection surfaces interposed between each projection objective and the corresponding projection surface and means for maintaining invariable the distance of each said intermediate optical members from a fixed point on the corresponding projection surface, which distance is substantially equal to the focal length of the said intermediate optical member, as and for the purpose set forth.

2. An automatically drawing measuring apparatus for pairs of measuring views of a solid object, comprising a three-dimensional cross-slide system, a drawing pencil and two measuring view carriers, capable of being moved by the said cross-slide system, an objective in each measuring view carrier located in the centre of projection of the measuring view, a binocular viewing glass, projection surfaces fixed to the binocular viewing glass, one for each of the two measuring views to be separately projected, an intermediate optical member for forming a sharp image of the measuring views on the projection surfaces interposed between each projection objective and the corresponding projection surface, links for keeping the intermediate optical members directed towards the corresponding projection objectives, a pair of hollow spheres, one fixed rigidly at either end of the binocular viewing glass, another pair of hollow spheres, each at one end of one of the said links, having the intermediate optical member fixed to it, the second pair of hollow spheres being capable of rotating in the former pair of hollow spheres, for maintaining invariable the distance of each said intermediate optical members from a fixed point on the corresponding projection surface, which distance is substantially equal to the focal length of the said intermediate optical member, as and for the purpose set forth.

3. An automatically drawing measuring apparatus for pairs of measuring views of a solid object, comprising a three-dimensional cross-slide system, a drawing pencil and two measuring view carriers capable of being moved by the said cross-slide system, an objective in each measuring view carrier located in the centre of projection of the measuring view, a binocular viewing glass, translucent projection surfaces fixed to the binocular viewing glass, one for each of the two measuring views to be separately projected, an intermediate optical member for forming a sharp image of the measuring views on the projection surfaces interposed between each projection objectives and the corresponding projection surface, there being measuring marks in the binocular viewing glass, non-translucent reflectors fixed to the fixed binocular viewing glass, by means of which the projections of the two measuring views can be viewed with the translucent projection surface, such that images of the centres of rotation of the intermediate optical members are formed on the measuring marks of the binocular viewing glass, and means for maintaining invariable the distance of each said intermediate optical members from a fixed point on the corresponding projection surface, which distance is substantially equal to the focal length of the said intermediate optical member, as and for the purpose set forth.

4. An automatically drawing measuring apparatus for pairs of measuring views of a solid object, comprising a three-dimensional cross-slide system, a drawing pencil and two measuring view carriers capable of being moved by the said cross-slide system, an objective in each measuring view carrier located in the centre of projection of the measuring view, a binocular viewing glass, projection surfaces fixed to the binocular viewing glass, one for each of the two measuring views to be separately projected, an intermediate optical member for forming a sharp image of the measuring views on the projection surfaces interposed between each projection objective and the corresponding projection surface, there being measuring marks in the binocular viewing glass, a transparent reflector and an opaque reflector fixed at either end of the binocular viewing glass, by means of which the projections of the two measuring views can be viewed with an opaque projection plane, such that images of the centres of rotation of the auxiliary lenses are formed on the measuring marks of the binocular viewing glass, and means for maintaining invariable the distance of each said intermediate optical members from a fixed point on the corresponding projection surface, which distance is substantially equal to the focal length of the said intermediate optical member, as and for the purpose set forth.

5. An apparatus as claimed in claim 4, and having between each fixed transparent reflector and the fixed opaque reflector coacting with the same flat sheet of glass, mounted so as to take part in the rotary motion of the intermediate optical member, for the purpose of counteracting the ray displacement caused by the transparent reflector, as and for the purpose set forth.

In testimony whereof I have signed my name to this specification.

REINHARD HUGERSHOFF.